United States Patent Office 3,141,016
Patented July 14, 1964

3,141,016
6β:19-OXIDO-ANDROSTANE
Albert Wettstein, Riehen, Georg Anner, Karl Heusler, and Jaroslav Kalvoda, Basel, Hellmut Ueberwasser, Riehen, and Jules Heer, Binningen, Switzerland, assignors to Ciba Corporation, New York, N.Y., a corporation of Delaware
No Drawing. Filed Sept. 7, 1962, Ser. No. 222,201
Claims priority, application Switzerland July 15, 1960
15 Claims. (Cl. 260—239.55)

This application is a continuation-in-part of our co-pending application Ser. No. 122,657, filed July 10, 1961, now abandoned, by Albert Wettstein et al.

The present invention relates to novel 3-oxygenated-5α-halogen-6β,19-oxido-androstanes, more especially to compound of the formula

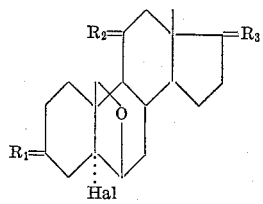

wherein $R_1$ stands for oxo or a hydrogen atom together with a hydroxy or acyloxy, $R_2$ stands for hydrogen, oxo or hydrogen together with hydroxy or acyloxy, $R_3$ stands for oxo, β-hydroxy or β-acyloxy together with hydrogen, lower alkyl, lower alkenyl or lower alkinyl and Hal stands for a halogen atom with an atomic weight above 30, especially chlorine or bromine.

The acyloxy radicals mentioned above, representing esterified hydroxyl groups, are more especially those of aliphatic, cycloaliphatic, cycloaliphatic-aliphatic, araliphatic, aromatic or heterocyclic carboxylic acids containing at most 15 carbon atoms, such as for example formic, acetic, propionic, butyric, valeric, trimethylacetic, caproic, oenanthic, decanoic, trifluoroacetic, carbonicmonomethyl- or ethylester, hexahydrobenzoic, cyclopentyl-propionic, phenyl-propionic, benzoic or furoic acid. The lower alkyl, alkenyl or alkinyl radicals are such as contain at most 7 carbon atoms, for example methyl, ethyl, n- or i-propyl, -butyl, -pentyl, -hexyl or -heptyl, vinyl, allyl, methallyl, ethinyl, 2-methyl-ethinyl, 2-chloro-ethinyl and 2-trifluoromethyl-ethinyl.

The compounds of the present invention are extremely important intermediates for the production of 19-nor androstanes to which class of compounds belong several well known androgenic, anabolic, gestagenic agents and ovulation inhibitors such as 19-nor-testosterone and its esters, 17α-methyl-19-nor-testosterone, 17α-ethinyl-19-nor-testosterone, $\Delta^{5(10)}$-3-oxo-17β-hydroxy-17α-ethinyl-19-nor-testosterone.

The 19-nor-androstanes are produced from the 6β:19-oxido-androstane of the present invention by converting the $R_1$ substituent in an oxo group, elimination hydrohalic acid to form a 4,5-double bond, treating the $\Delta^4$-3-oxo-6β:19-oxido-androstene obtained with zinc and acetic acid at slightly elevated temperature and elimination the angular C-19-substituent in the $\Delta^4$-3-oxo-19-hydroxy-androstane formed in known manner, preferably after oxidizing the 19-hydroxy group to an aldehyde or acid function.

Among the 5-halogen-6β:19-androstane of the invention the following are particularly important: 3β:17β-dihydroxy-5α-chloro- or -bromo-6β:19-oxido-androstane, 3β-hydroxy-5α-chloro- or -bromo-6β:19-oxido-17-oxo-androstane, 3β:17β-dihydroxy-5α-chloro- or -bromo-6β:19-oxido-17α-methyl- or -ethyl-androstane, 3β:17β-dihydroxy-5α-chloro- or -bromo-6β:19-oxido-17α-ethinyl-androstane; the corresponding 3-oxo-compounds, such as 3:17-dioxo-5α-chloro-6β:19-oxido-androstane, or 3-oxo-5α-chloro-6β:19-oxido - 17β - hydroxy-17α-R-androstane, wherein R stands for methyl, ethyl, butyl, isobutyl, vinyl, allyl, ethinyl or 2-methyl-ethinyl.

The andostranes of the present invention are obtained either by treating a 5α-halogen-6β-hydroxy-androstane with lead tetraacetate in boiling benzene or cyclohexane for several hours or by reacting a 5α-halogen-6β-hydroxy-androstane in boiling cyclohexane solution with monovalent, positive iodine preferable in the presence of free iodine and strong visible light for 10 to 90 minutes. The monovalent positive iodine may be obtained from N-iodosuccinimide or from silver acetate and iodine or mercuric acetate and iodine. An especially efficient metal for the preparation of the 5α-halogen-6β:19-oxido-androstane consists in treating a 5α-halogen-6β-hydroxy androstane in an apolar solvent, e.g., in boiling cyclohexane solution with lead tetraacetate and iodine. The 5α-halogen-6β:19-oxido grouping formed in the above mentioned reactions is stable under both alkaline and acidic conditions. Ester grouping, e.g., in 3-, 11- and/or 17-positions may therefore be hydrolyzed in the usual manner, ketal groups, e.g., in 3- and 17-positions may be cleaved by acid treatment, hydroxyl groups, e.g., in 3-, 11- and/or 17-positions may be oxidized to oxo groups. It is even possible to reduce oxo groups present, e.g., in 11- and/or 17-positions by lithium aluminum hydride or sodium borohydride without affecting the 6β:19-oxido group. If desired a hydrocarbon radical may be introduced in 17α-position by reacting a 5α-halogen-6β:19-oxido-17-oxo-androstane with a Grignard reagent, e.g., methyl magnesium iodide, ethyl magnesium bromide, allyl magnesium bromide, or with an organometal compound such as sodium or lithium acetylide, sodium chloroacetylide etc.

The 5α-halogen-6β-hydroxy-androstanes used as starting materials are prepared from the corresponding 5,6-unsaturated compounds by addition of a hypohalous acid, e.g., hypochlorous or hypobromous acid.

The following examples illustrate the invention. The temperatures are given in centigrades.

Example 1

A suspension of 22.0 grams of calcium carbonate and 66.0 grams of dried lead tetraacetate in 3.3 liters of cyclohexane is heated to 80° C., 17.6 grams of iodine are added, and the mixture is refluxed and stirred for 20 minutes in the dark. The slightly cooled reaction solution is treated with 11.0 grams of 3β-acetoxy-5α-chloro-6β-hydroxy-17-oxoandrostane and then refluxed with stirring for 2 hours in daylight. The cooled reaction mixture is filtered, the residue exhaustively washed with absolute ether and the filtrate is washed with sodium thiosulfate solution of 10% strength and with water. Evaporation of the dried solution under vacuum yields 12.1 grams of a crystalline product which, after recrystallization from ether+methanol, yields 7.65 grams of 3β-acetoxy-5α-chloro-6β:19-oxido-17-oxo-androstane melting at 180 to 182° C. The infra-red absorption spectrum of the pure compound contains bands, inter alia, at 5.76, 6.73, 7.35, 8.10, 9.65, 10.60, 10.82, 11.35, 11.67 and 12.50μ.

A solution of 2.0 grams of 3β-acetoxy-5α-chloro-6β:19-oxido-17-oxo-androstane in 200 cc. of methanol is mixed with a solution of 2.0 grams of potassium carbonate in 10 cc. of water and the whole is refluxed for one hour. The reaction mixture is treated with water and freed from methanol under vacuum, taken up in ether, washed three times with water, dried with sodium sulfate and evaporated. Yield: 1.620 grams of 3β-hydroxy-5α-chloro-6β:19-oxido-17-oxo-androstane melting at 223–226° C.

After having been recrystallized from methylene chloride+methanol the pure compound melts at 227 to 229° C. and displays in the infra-red spectrum absorption bands, inter alia, at 2.80, 3.28, 5.78, 6.75, 9.55, 9.78, 10.05, 10.63, 10.87, 11.33, 11.70 and 12.55μ.

The starting material used in this example is prepared as follows: 5.0 grams of Δ$^5$-3β-acetoxy-17-oxo-androstene are dissolved in 80 ml. of ether. A solution of 8.0 grams of chlorinated lime in 300 ml. of water and finally 6.1 ml. of glacial acetic acid are added and the mixture is vigorously stirred for 30 minutes. The reaction mixture is diluted with ether and methylene chloride, separated, the organic layer washed with water, dried and the solvents evaporated. The residue is crystallized from methylene chloride-ether. 2.84 grams of 3β-acetoxy-5α-chloro-6β-hydroxy-17-oxo-androstene melting at 225–227° are obtained.

In an identical manner there is prepared

From Δ$^5$-3β:17β-diacetoxy-androstene the 3β:17β-diacetoxy+5α-chloro-6β-hydroxy-androstane melting at 197–199°

From Δ$^5$-3β-acetoxy-17β-hydroxy-17α-methyl-androstene the 3β-acetoxy-5α-chloro-6β:17β-dihydroxy-17α-methyl-androstane melting at 179–181° and From Δ$^5$-3β:17β-diacetoxy-17α-methyl-androstene the 3β:17β-diacetoxy-5α-chloro-6β-hydroxy-17α-methyl-androstane.

Example 2

7.5 grams of 3β-acetoxy-6β:19-oxido-5α-chloro-17-oxo-androstane in 100 cc. of toluene are treated with a Grignard reagent prepared from 8 cc. of methyl iodide in 120 cc. of ether with the aid of excess magnesium. When heat is no longer being evolved, the mixture is heated while distilling off the solvent until the temperature of the remaining reaction mixture has risen to 90° C. The whole is then diluted with benzene and the reaction products are dissolved by adding aqueous ammonium chloride solution and dilute hydrochloric acid. The organic phase is washed with sodium thiosulfate solution, dried and evaporated, to yield 7 grams of crude 3β:17β-dihydroxy-5α-chloro-6β:19-oxido-17α-methyl-androstane which crystallizes on addition of a small amount of methylene chloride and is obtained from isopropanol in crystals which melt at 212 to 214° C. and contain 1 molecular equivalent of isopropanol of crystallization.

9 grams of this product are dissolved in acetone and treated with excess aqueous chromic acid in the presence of a small amount of sulfuric acid for 10 minutes at 10 to 15° C., diluted with much water, the crude 3-oxo-5α-chloro-6β:19-oxido-17α-methyl-17β-hydroxy-androstane is suctioned off and the moist filter residue is boiled in 1 liter of methanol with 25 grams of potassium acetate while distilling off methanol, the residue is taken up in benzene, the benzene solution is washed with water, dried and evaporated. There are obtained 6.9 grams of 6β:19-oxido-17α-methyl-testosterone which, after recrystallization from benzene, melts at 157 to 158° C.

When 3β-acetoxy-6β:19-oxido-5α-chloro-17-oxo-androstane is reacted in a similar manner with ethyl magnesium bromide, there is obtained 3β:17β-dihydroxy-5α-chloro-6β:19-oxido-17α-ethyl-androstane which, by oxidation and treatment with potassium acetate as described above, yields 6β:19-oxido-17α-ethyl-testosterone.

When in the above example methyl magnesium iodide is replaced by allyl magnesium bromide, there is obtained 3β:17β-dihydroxy-5α-chloro-6β:19-oxido-17α-allyl-androstane which, in the form of the crude crystallizate, melts at 205 to 207° C. and displays in the infra-red absorption spectrum bands, inter alia, at 2.75, 6.12, 6.75, 6.9, 7.6, 9.5, 9.76, 10.0 and 10.85μ. When it is treated as described above with chromic acid, it yields 3-oxo-17β-hydroxy-5α-chloro-6β:19-oxido-17α-allyl-androstane (characteristic bands in the infra-red spectrum at 5.8, 6.1, 6.7, 7.5, 8.1, 9.1 and 9.7μ) which, on treatment with methanolic potassium acetate as described above, yields Δ$^4$-3-oxo-6β:19-oxido-17α-allyl-17β-hydroxy-androstene melting at 90° C. Characteristic bands in the infra-red spectrum at 6.0, 6.1, 6.8, 7.26, 8.35, 8.75, 9.74, 10.63 and 11.36μ.

Example 3

A mixture of 59.4 grams of lead tetraacetate, 27 grams of calcium carbonate and 2430 cc. of cyclohexane is heated for 30 minutes at the boil, then treated with 13.45 grams of crude 3β-acetoxy-5α-bromo-6β-hydroxy-17-oxo-androstane and 17.5 grams of iodine, and then further boiled and stirred while being irradiated with a 500-watt lamp. After one hour the solution is colorless; it is cooled, filtered, the filter residue is rinsed with cyclohexane and the filtrate is agitated with dilute sodium thiosulfate solution. The organic solution is then dried and evaporated in a water-jet vacuum. The oily residue (22.75 grams) is dissolved in a 1:4-mixture of benzene and hexane and filtered through 200 grams of alumina. At first a high-boiling oil is eluted, then 1:4- and 1:1-mixtures of benzene and hexane elute about 7.0 grams of substance. Crystallization of this fraction residue from methylene chloride+ether yields 5.5 grams of pure 3β-acetoxy-5α-bromo-6β:19-oxido-17-oxo-androstane of double melting point 174–178/184–187° C. Optical rotation [α]$_D$=+44.6° (in chloroform). The infra-red spectrum of the compound contains bands, inter alia, at 5.76, 6.68, 7.30, 8.09, 9.16 and 10.92μ.

From the following fraction eluted with benzene and with mixtures of benzene and ethyl acetate there is isolated by crystallization from methanol or from methylene chloride+ether a compound of the formula $C_{21}H_{30}O_4$ melting at 219 to 221° C. Optical rotation [α]$_D$=−8.7° (in chloroform). The infra-red spectrum of the compound contains bands, inter alia, at 5.96, 7.26, 7.31, 8.10, 9.73 and 11.52μ.

A mixture of 5.07 grams of 3β-acetoxy-5α-bromo-6β:19-oxido-17-oxo androstane in 500 cc. methanol with a solution of 5.0 grams of potassium carbonate in 50 cc. of water is heated for one hour on a bath maintained at 80° C., then evaporated in a water-jet vacuum until crystallization sets in, taken up in methylene chloride and the organic solution is washed with water, dried and evaporated, to yield 4.52 grams of crude crystalline 3β-hydroxy-5α-bromo-6β:19-oxido-17-oxo-androstane which melts at 214 to 218° C. after recrystallization from methylene chloride+ether (conversion above 188° C.). Optical rotation [α]$_D$=+47.1° (in chloroform). The infra-red spectrum contains bands, inter alia, at 2.75, 5.75, 6.69, 9.52, 9.79, 10.06 and 11.05μ.

Example 4

10.0 grams of mercuric diacetate and 3.0 grams of calcium carbonate are suspended in 200 cc. of cyclohexane. After adding 2.5 grams of 3β-acetoxy-5α-chloro-6β-hydroxy-17-oxo-androstane and 11.0 grams of iodine, the reaction mixture is heated to the boil for 1 hour while being stirred and irradiated with a 500-watt lamp. A large quantity of red mercuric iodide separates. The reaction mass is cooled, the precipitate separated by filtration and washed with cyclohexane. The filtrate is washed with potassium iodide solution of 5% strength, decolorized with sodium thiosulfate, washed with water, dried and evaporated. There are obtained 2.97 grams of crystalline crude product which is recrystallized from a mixture of ether and hexane to yield 1.70 grams of pure 3β-acetoxy-5α-chloro-6β:19-oxido-17-oxo-androstane melting at 180-182° C.

Example 5

4.5 grams of iodine are added to a suspension of 5.0 grams of silver acetate and 2.5 grams of 3β-acetoxy-5α-chloro-6β-hydroxy-17-oxo-androstane in 200 cc. of cyclohexane, and the reaction mixture heated to the boil while being stirred and irradiated. After two hours, the mixture is cooled, filtered, the residue is washed with cyclohexane and the filtrate decolored by extraction with dilute thiosulfate solution and water. By evaporating the cyclohexane solution there are obtained 2.82 grams of crystalline residue which in addition to a small amount of oily by-products consists mainly of 3β-acetoxy-5α-chloro-6β:19-oxido-17-oxo-androstane. By crystallization from a mixture of ether and hexane there are obtained 1.95 grams of the pure compound melting at 180–182° C.

*Example 6*

2.5 grams of 3β-acetoxy-5α-chloro-6β-hydroxy-17-oxo-androstane, 3.0 grams of calcium carbonate, 5.0 grams of N-iodosuccinimide and 2.85 grams of iodine are suspended in 200 cc. of cyclohexane and the mixture heated to the boil for 3 hours while being stirred and irradiated. After 1½ hours, a further 5.0 grams of N-iodosuccinimide are added. At the end of the reaction time, the mixture is cooled, the precipitate filtered off and washed with cyclohexane. The filtrate is washed with potassium iodide solution, sodium thiosulfate solution and water, dried and evaporated under a water-jet vacuum. There are obtained 824 mg. of 3β-acetoxy-5α-chloro-6β:19-oxido-17-oxo-androstane. The filter residue is extracted with 250 cc. of methylene chloride and the extract washed in the same manner as the cyclohexane solution mentioned above, dried and evaporated. The residue (1.812 grams) yields on crystallization from ether 1.45 grams of pure starting material melting at 225–227° C.

*Example 7*

2.5 grams of 3β-acetoxy-5α-chloro-6β-hydroxy-17-oxo-androstane are suspended in 200 cc. of cyclohexane. 3.0 grams of calcium carbonate, 4.0 grams of N-bromosuccinimide and 2.85 grams of iodine are added, and the whole is boiled under reflux for two hours while being stirred and irradiated. The reaction mixture is worked up as described in Example 6. There are obtained 3.128 grams of an oil which crystallizes on the addition of ether and hexene. For the purpose of purification a benzene solution of the crude product is filtered through 25 grams of aluminum oxide and washed well with benzene (a total of 400 cc.). A residue (2.74 grams) is obtained which consists mainly of 3β-acetoxy-5α - chloro - 6β:19-oxido-17-oxo-androstane. The pure product, melting at 180–182° C., is isolated by crystallization from a mixture of ether and hexane.

*Example 8*

A mixture of 150 cc. of cyclohexane, 1.0 gram of calcium carbonate, 3.0 grams of lead tetraacetate and 980 mg. of iodine is heated for ½ hour with stirring at 80° C. in the dark. 500 mg. of 3β:17β-diacetoxy-5α-chloro-6β-hydroxy-androstane are added and the reaction mixture is refluxed further (1½ to 2½ hours) until it has lost its color. The cooled solution is filtered, the residue is washed with ether, and the filtrate is washed with sodium thiosulfate solution of 10% strength and water, dried and evaporated under reduced pressure. Yield: 620 mg. of amorphous 3β:17β-diacetoxy-5α-chloro-6β:19-oxido-androstane mixed with a small amount of a sparingly volatile oil of aromatic odour; the product is purified on alumina. After crystallization from alcohol the pure compound melts at 160 to 161° C. Its infra-red spectrum contains, in addition to the strong acetate absorptions at 5.76, 8.16 and 9.65μ, absorption bands at 6.72, 10.60, 10.75 and 12.51μ.

A solution of 870 mg. of crude 3β:17β-diacetoxy-5α-chloro-6β:19-oxido-androstane in 50 cc. of methanol is treated with 250 mg. of sodium hydroxide in 1 cc. of water; the mixture is kept for 3 days at 25° C., treated with water, and the methanol is evaporated under vacuum. The residue is taken up in ether+methylene chloride, washed with water until it is neutral and the product isolated in the usual manner, to yield 680 mg. of crystalline 3β:17β - dihydroxy-5α-chloro-6β:19-oxido-androstane. After one recrystallization the compound melts at 220 to 224° C. The infra-red absorption spectrum contains bands, inter alia, at 2.76, 6.75, 7.00, 7.30, 9.55, 9.76, 10.62, 10.90, 11.70 and 12.60μ.

*Example 9*

A mixture of 22 grams of lead tetraacetate, 10 grams of calcium carbonate and 900 cc. of cyclohexane is heated with stirring for 30 minutes at the boil. 5.0 grams of 3β:17β - diacetoxy-5α-bromo-6β-hydroxy-androstane and 6.4 grams of iodine are then added and the whole is stirred for another hour at the boil while being irradiated with a 500-watt lamp, then cooled, the colorless solution is filtered and the filtrate is washed with water, dried and evaporated in a water-jet vacuum. There are obtained 5.53 grams of a crude product which is dissolved in a 1:4-mixture of benzene and hexane and filtered through 100 grams of alumina. Elution with a 1:4-mixture and a 1:1-mixture of benzene and hexane and with plain benzene elutes 3.4 grams of substance which after crystallization from methylene chloride+ether+hexane yields 2.6 grams of pure 3β:17β-diacetoxy-5α-bromo-6β:19-oxido-androstane melting at 178 to 180° C. Optical rotation $[\alpha]_D = -5.4°$ C. (in chloroform). In the infra-red spectrum of the compound there are bands, inter alia, at 5.78, 6.69, 7.30, 8.10, 9.12, 9.63, 9.75 and 10.93μ.

A mixture of 2.236 grams of the latter compound, 225 cc. of methanol and a solution of 2.25 grams of potassium carbonate in 22.5 ml. of water is refluxed for one hour. The reaction mixture is then cooled and concentrated in a water-jet vacuum until crystallization sets in. The concentrate is taken up in a 3:1-mixture of methylene chloride and methanol and washed with water. The organic solution is dried and evaporated, to yield 1.83 grams of pure 3β:17β-di-hydroxy-5α-bromo-6β:19-oxido-androstane melting at 235 to 236° C. Optical rotation $[\alpha]_D = -8.7°$ (in chloroform). Infra-red bands (in Nujol), inter alia, at 2.93, 6.70, 7.72, 8.61, 9.03, 9.38, 11.08, 11.76 and 12.69μ.

*Example 10*

5.0 grams of mercuric acetate and 2.5 grams of 3β-acetoxy - 5α - chloro - 6β - hydroxy - 17 - oxo - androstane are suspended in 100 cc. of carbon tetrachloride. After adding 3.85 grams of iodine, the mixture is boiled under reflux for one hour while being irradiated with a 500 watt lamp, and after the color of the iodine has disappeared (after about 10 to 15 minutes) another 1.9 grams of iodine are added. During the reaction much red mercuric iodide precipitates. The cooled solution is filtered, the residue washed with carbon tetrachloride and the filtrate washed with potassium iodide solution and thiosulfate solution, dried and evaporated. From the residue (2.63 grams) there are obtained by crystallization from a mixture of ether and hexane 2.16 grams of pure 3β-acetoxy-5α-chloro-6β:19-oxido-17-oxo-androstane melting at 180–182° C.

*Example 11*

When a suspension of 5.0 grams of mercuric acetate and 2.5 grams of 3β-acetoxy-5α-chloro-6β-hydroxy-17-oxo-androstane in 100 cc. of carbon tetrachloride is heated to the boil for 16 hours in the dark after the addition of 3.98 grams of iodine and the violet solution is then worked up as described in Example 15, there are obtained 2.72 grams of a crystalline crude product which in the infrared spectrum shows in the CO area a distinct band at 5.60μ in addition to the bands of the 17-ketone and the 3-acetate at 5.80μ and which consists chiefly of 3β-acetoxy - 5α-chloro-6β:19-oxido-17-oxo-androstane. The crude product contains in addition a small quantity of 6β:19 - lactone of 3β-acetoxy-5α-chloro-6β-hydroxy-17-oxo-androstane-19-acid.

*Example 12*

40 grams of 3β-acetoxy-5α-chloro-6β-hydroxy-17-oxoandrostane and 70 grams of lead tetraacetate (containing 7 grams of glacial acetic acid) are added to a solution of 5.0 grams of iodine in 400 cc. of carbon tetrachloride, and the mixture is heated at the boil with stirring. In the course of the reaction the color of the iodine disappears almost completely. The mixture is then cooled to room temperature, the lead salts are filtered off and the reddish filtrate is washed in turn with aqueous sodium thiosulfate solution, dilute sodium carbonate solution and water. Finally, the colorless carbon tetrachloride is filtered off from a little precipitated lead iodide and the filtrate is evaporated to dryness.

The crystalline residue (about 40 grams) is boiled for a short time in 80 cc. of methanol and after being allowed to stand for a while at 0–5° C. filtered with suction.

There are obtained 32 to 34 grams of pure white $3\beta$-acetoxy-$5\alpha$-chloro-$6:19$-oxido-17-oxo-androstane melting at 180–182° C. (sintering from 170° C.).

*Example 13*

8.75 grams of lead tetraacetate and 4.0 grams of calcium carbonate are suspended in 200 ml. of carbon tetrachloride. After the addition of 2.0 grams of $3\beta:11\alpha:17\beta$ - triacetoxy - $5\alpha$ - chloro - $6\beta$ - hydroxy - $17\alpha$ - methyl-androstane (prepared from $\Delta^4$-3-oxo-$11\alpha:17\beta$-dihydroxy-$17\alpha$-methyl-androstene by acetylation to the $11\alpha:17\beta$-diacetate and enolacetylation to give $\Delta^{3,5}$-3:$11\alpha:17\beta$-triacetoxy-$17\alpha$-methyl-androstadiene, sodium borohydride reduction, reacetylation and addition of hypochlorous acid to the 5:6-double bond) and of 2.57 grams of iodine the reactive mixture is stirred and boiled under reflux while irradiating with a 500 watt lamp until the color of iodine disappears (about 30 minutes). The cooled reaction mixture is processed as described in the previous example. The residue (11.2 grams) contains a mixture of the $3\beta:11\alpha:17\beta$-triacetoxy-$5\alpha$-chloro-$6\beta:19$-oxido-$17\alpha$-methyl-androstane and the $3\beta:11\alpha:17\beta$-triacetoxy-$5\alpha$-chloro-$6\beta:19$-oxido-19-hydroxy-$17\alpha$ - methyl - androstane which is separated by chromatography on 30 grams of alumina.

What is claimed is:
1. A 3-oxygenated $5\alpha$-halogen-$6\beta:19$-oxido-androstane of the formula

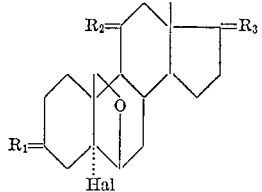

wherein
 $R_1$ stands for a member selected from the group consisting of oxo, hydroxy together with hydrogen and acyloxy together with hydrogen,
 $R_2$ stands for a member selected from the group consisting of hydrogen, $\alpha$-hydroxy together with hydrogen and $\alpha$-acyloxy together with hydrogen,
 $R_3$ stands for a member selected from the group consisting of oxo, $\beta$-hydroxy together with hydrogen, $\beta$-acyloxy together with hydrogen, $\beta$-hydroxy together with lower alkyl, $\beta$-hydroxy together with lower alkenyl and $\beta$-hydroxy together with lower alkinyl and
 Hal stands for a halogen atom selected from the group consisting of bromine and chlorine, said acyloxy substituents being derived from acids selected from the group consisting of aliphatic, cycloaliphatic, cycloaliphatic-aliphatic, araliphatic, aromatic and heterocyclic carboxylic acids having, at most, 15 carbon atoms.

2. $3\beta$ - acetoxy - $5\alpha$ - chloro - $6\beta:19$ - oxido - 17 - oxo-androstane.
3. $3\beta$ - hydroxy - $5\alpha$ - chloro - $6\beta:19$ - oxido - 17 - oxo-androstane.
4. $3\beta:17\beta$ - dihydroxy - $5\alpha$ - chloro - $6\beta:19$ - oxido-$17\alpha$-methyl-androstane.
5. 3 - oxo - $5\alpha$ - chloro - $6\beta:19$ - oxido - $17\alpha$ - methyl-$17\beta$-hydroxy-androstane.
6. $3\beta:17\beta$ - dihydroxy - $5\alpha$ - chloro - $6\beta:19$ - oxido-$17\alpha$-ethyl-androstane.
7. $3\beta:17\beta$ - dihydroxy - $5\alpha$ - chloro - $6\beta:19$ - oxido-$17\alpha$-allyl-androstane.
8. 3 - oxo - $5\alpha$ - chloro - $6\beta:19$ - oxido - $17\alpha$ - allyl-$17\beta$-hydroxy-androstane.
9. $3\beta$ - acetoxy - $5\alpha$ - bromo - $6\beta:19$ - oxido - 17 - oxo-androstane.
10. $3\beta$ - hydroxy - $5\alpha$ - bromo - $6\beta:19$ - oxido - 17 - oxo-androstane.
11. $3\beta:17\beta$ - diacetoxy - $5\alpha$ - chloro - $6\beta:19$ - oxido-androstane.
12. $3\beta:17\beta$ - dihydroxy - $5\alpha$ - chloro - $6\beta:19$ - oxido-androstane.
13. $3\beta:17\beta$ - diacetoxy - $5\alpha$ - bromo - $6\beta:19$ - oxido-androstane.
14. $3\beta:17\beta$ - dihydroxy - $5\alpha$ - bromo - $6\beta:19$ - oxido-androstane.
15. $3\beta:11\alpha:17\beta$ - triacetoxy - $5\alpha$ - chloro - $6\beta:19$-oxido-$17\alpha$-methyl-androstane.

References Cited in the file of this patent
UNITED STATES PATENTS
3,065,228     Bowers _____ Nov. 20, 1962